(12) United States Patent
Kobayashi et al.

(10) Patent No.: US 10,847,035 B2
(45) Date of Patent: Nov. 24, 2020

(54) DEMAND RESPONSIVE OPERATION SYSTEM

(71) Applicant: Panasonic Intellectual Property Management Co., Ltd., Osaka (JP)

(72) Inventors: Norihiko Kobayashi, Tokyo (JP); Hiroki Kawahara, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/086,967

(22) PCT Filed: Feb. 13, 2017

(86) PCT No.: PCT/JP2017/005044
§ 371 (c)(1),
(2) Date: Sep. 20, 2018

(87) PCT Pub. No.: WO2017/169181
PCT Pub. Date: Oct. 5, 2017

(65) Prior Publication Data
US 2019/0103028 A1   Apr. 4, 2019

(30) Foreign Application Priority Data
Mar. 28, 2016   (JP) .................. 2016-063524

(51) Int. Cl.
*G08G 1/00*   (2006.01)
*G08G 1/127*  (2006.01)
(Continued)

(52) U.S. Cl.
CPC ........... *G08G 1/202* (2013.01); *G01C 21/343* (2013.01); *G01C 21/3407* (2013.01);
(Continued)

(58) Field of Classification Search
CPC .......... G08G 1/202; G08G 1/00; G08G 1/127; G01C 21/343; G01C 21/3438;
(Continued)

(56) References Cited

U.S. PATENT DOCUMENTS

2013/0158846 A1* 6/2013 Zhang .................... G08G 1/123
701/117
2015/0182158 A1   7/2015 Ino et al.
(Continued)

FOREIGN PATENT DOCUMENTS

| JP | 2004-199179 | 7/2004 |
| JP | 2004-227262 | 8/2004 |

(Continued)

OTHER PUBLICATIONS

International Search Report of PCT application No. PCT/JP2017/005044 dated May 16, 2017.
(Continued)

*Primary Examiner* — Brian Wilson
(74) *Attorney, Agent, or Firm* — Greenblum & Bernstein, P.L.C.

(57) ABSTRACT

A demand responsive operation system includes: a user terminal; an on-demand vehicle that operates based on a use request from the user terminal; and an operation management center that manages an operation of the on-demand vehicle. The operation management center includes a use receiver and an operation plan generator. The use receiver receives the use request from the user terminal. The operation plan generator generates an operation plan within a permissible range of a reference operation schedule based on the reference operation schedule and the use request received by the use receiver, the reference operation schedule having an operation section, a departure place departure time and a final destination arrival time preset, and provides
(Continued)

the generated operation plan to the on-demand vehicle and the user terminal. The user terminal presents this operation plan to a user, and the on-demand vehicle operates according to this operation plan.

12 Claims, 11 Drawing Sheets

(51) Int. Cl.
G01C 21/34 (2006.01)
G06Q 50/30 (2012.01)
G01C 21/36 (2006.01)

(52) U.S. Cl.
CPC ....... *G01C 21/3438* (2013.01); *G01C 21/362* (2013.01); *G06Q 50/30* (2013.01); *G08G 1/00* (2013.01); *G08G 1/127* (2013.01); *Y02T 90/16* (2013.01)

(58) Field of Classification Search
CPC .. G01C 21/362; G01C 21/3407; G06Q 50/30; G06Q 30/0201; Y02T 90/161
See application file for complete search history.

(56) References Cited

U.S. PATENT DOCUMENTS

| 2015/0228192 A1 | 8/2015 | Kawamoto et al. |
| 2015/0324708 A1* | 11/2015 | Skipp .................... H04W 4/029 705/5 |
| 2017/0053531 A1* | 2/2017 | Ullrich .................... G06Q 10/04 |
| 2017/0200249 A1* | 7/2017 | Ullrich .................... G06Q 50/30 |
| 2018/0189920 A1* | 7/2018 | Li .......................... G06O 50/30 |
| 2019/0227553 A1* | 7/2019 | Kentley-Klay ...... G05D 1/0088 |

FOREIGN PATENT DOCUMENTS

| JP | 2004-287548 | 10/2004 |
| JP | 2007-249952 | 9/2007 |
| JP | 2009-301078 | 12/2009 |
| JP | 4711174 B | 6/2011 |
| WO | 2014/045339 | 3/2014 |
| WO | 2014/045359 | 3/2014 |

OTHER PUBLICATIONS

English Translation of an Office Action dated Aug. 29, 2017 for the related Japanese Patent Application No. 2016-063524.
Kentaro Uesugi, Toyohide Watanabe, Naoto Mukai, "K-means-ho o Mochiita Yorimichigata Demand-bus no Heiretsu Unko Shuho", The Institute of Electronics, Information and Communication Engineers, Dai 19 Kai Proceedings of Data Engineering Workshop [online] DEWS2008 Data Engineering Workshop Miyazaki, Apr. 7, 2008 (Apr. 7, 2008), pp. 1 to 6, DEWS2008 D10-5.

* cited by examiner

DEMAND RESPONSIVE OPERATION SYSTEM

This application is a U.S. national stage application of the PCT International Application No. PCT/JP2017/005044 filed on Feb. 13, 2017, which claims the benefit of foreign priority of Japanese patent application 2016-063524 filed on Mar. 28, 2016, the contents all of which are incorporated herein by reference.

TECHNICAL FIELD

The present disclosure relates to a demand responsive operation system applicable to public transportation services such as buses.

BACKGROUND ART

In urban areas, public transportation services such as railways and buses are widespread, and people can move to their destinations without inconvenience even if the people do not own their private automobiles. Meanwhile, depopulated rural areas include an area where it is difficult to maintain the public transportation services such that unprofitable routes cannot help being abolished. In such an area as above, the nearest stations and bus stops are located distantly, which is extremely inconvenient for people who cannot drive their own automobiles or do not have public transport accesses. These people include young people, people requiring nursing care, some elderly people, and some handicapped people. Therefore, in the area, demand responsive transport (DRT) operating in response to a use request from a user is being introduced in place of fixed route and schedule transportation operating along predetermined operating routes and on operating schedules (that is, so called fixed-route bus services). The use request includes desired getting-on place, getting-on time, getting-off place, and getting-off time. Such a demand responsive bus is referred to as an on-demand bus with respect to such a fixed-route bus.

In a conventional on-demand bus operation system, generally, a user first issues a use request, then a place to get on an on-demand bus and a place to get off the on-demand bus (hereinafter, collectively referred to as "getting-on/off places") are set, and an operation plan including the getting-on/off places and a scheduled arrival time at each of the getting-on/off places is generated. That is, no operating schedule is predetermined as in the fixed-route bus services. Moreover, in some cases, the on-demand bus operation system performs the operation in accordance with a predetermined operating route (hereinafter, referred to as a "reference route") in which a departure place, a final destination and a through place are predetermined, and in some cases, the on-demand bus operation system sets a detour route so that the on-demand bus goes via the getting-on/off places when the user selects the getting-on/off places from candidate places, where the on-demand bus can stop, set in routes other than the reference route. Moreover, in some cases, the operating route is freely set to go via the getting-on/off places requested by the user. These operation methods are respectively referred to as a fixed route type, a detour route/area demand type, and a free route meeting point type. For example, PTL 1 discloses a vehicle operation management system for operating a bus through the shortest distance while causing the bus to go via without fail a plurality of getting-on/off places changing in response to a use request of a user as well as a departure place and a final destination.

CITATION LIST

Patent Literature

PTL 1: Japanese Patent No. 4,711,174

SUMMARY OF THE INVENTION

The present disclosure provides a demand responsive operation system capable of improving convenience for a user without increasing a burden on the public transportation enterprise (for example, a bus enterprise).

A demand responsive operation system according to an aspect of the present disclosure includes: a user terminal; an on-demand vehicle that operates based on a use request from the user terminal; and an operation management center that manages an operation of the on-demand vehicle. The user terminal, the on-demand vehicle and the operation management center are connected to one another to communicate information. The operation management center includes a use receiver and an operation plan generator. The use receiver receives the use request from the user terminal. The operation plan generator generates an operation plan within a permissible range of a reference operation schedule based on the reference operation schedule and the use request received by the use receiver, and provides the generated operation plan to the on-demand vehicle and the user terminal. An operation section, a departure place departure time and a final destination arrival time are preset in the reference operation schedule. The user terminal presents to the user the operation plan presented by the operation plan generator. The on-demand vehicle operates according to the operation plan provided by the operation plan generator.

In accordance with the present disclosure, there is provided the demand responsive operation system capable of improving the convenience for the user without increasing the burden on the public transportation enterprise (for example, the bus enterprise).

DESCRIPTION OF EMBODIMENT

Prior to description of an exemplary embodiment of the present invention, problems found in a conventional technique will briefly be described herein.

As mentioned above, in the conventional on-demand bus operation system, the bus operates in response to the use request from the user. Therefore, the user can get on and off the bus at the desired getting-on/off places. However, the conventional on-demand bus operation system has difficulty coping flexibly with the use request from the user, which is generated suddenly and asynchronously.

That is, when use requests different in desired getting-on time period are made by the plurality of users, then the number of operating buses will increase, and a burden on a bus enterprise will increase. Moreover, even if getting-on time periods of the plurality of users are the same, if an operation plan is generated to meet the individual use requests (desired getting-on/off places) of the users, then an operating route may be long, and it can happen that each user cannot get on a bus at a desired time or cannot get off the bus at a scheduled time. This may cause the user to feel inconvenient.

Hereinafter, the exemplary embodiment of the present disclosure will now be detailed with reference to the drawings.

Figure 1:
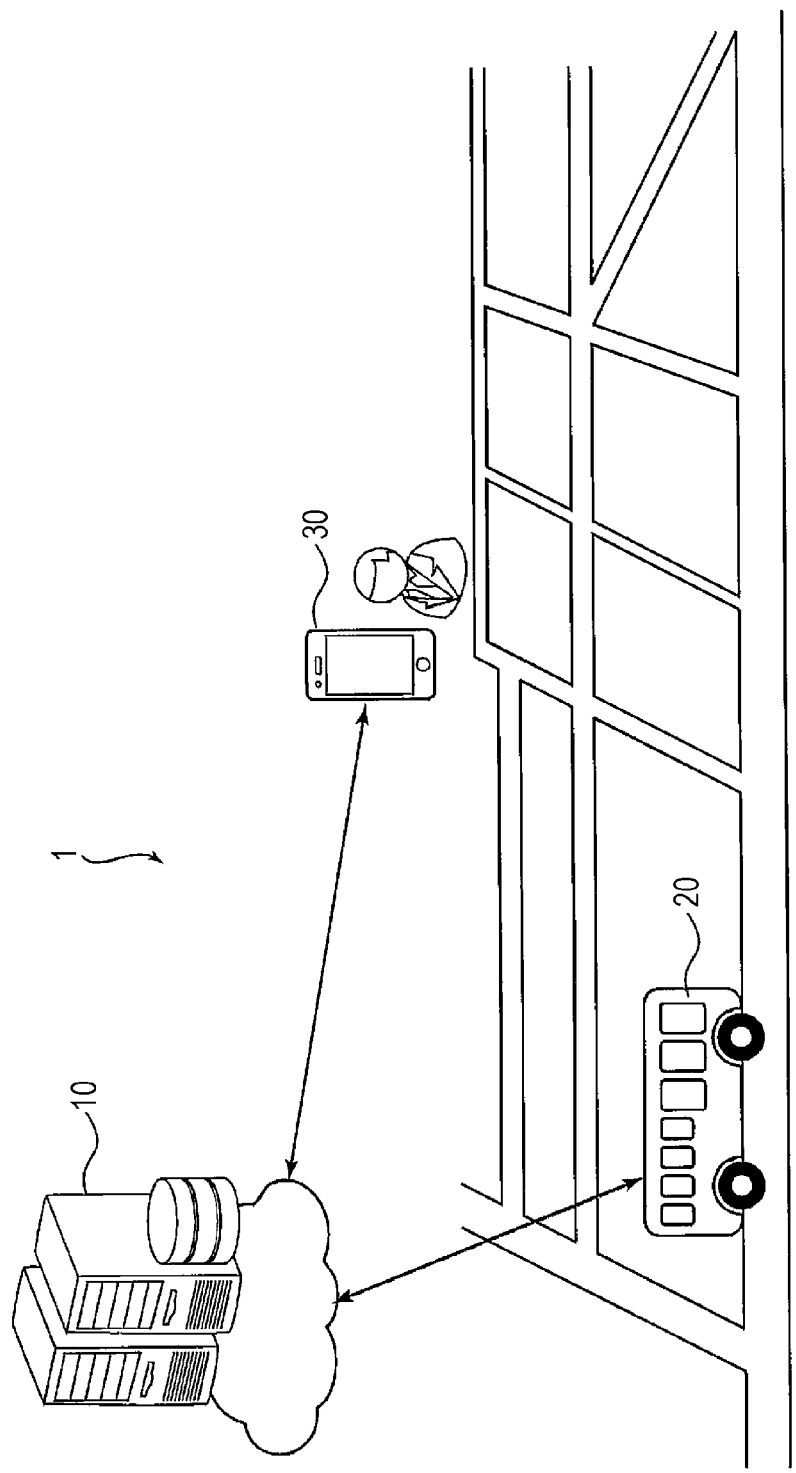
FIG. 1 is a diagram illustrating a configuration of a bus operation system according to an exemplary embodiment.

FIG. 1 is a diagram illustrating a configuration of bus operation system 1 as an example of a demand responsive operation system according to the present exemplary embodiment. Bus operation system 1 includes: operation management center 10 placed by a bus enterprise; on-demand bus 20 (on-demand vehicle) owned by the bus enterprise; and user terminal 30 owned by a user of bus operation system 1. Operation management center 10, on-demand bus 20, and user terminal 30 are connected to one another via a communication network (for example, the Internet network) to communicate information.

Though bus operation system 1 is simplified in FIG. 1, needless to say, on-demand bus 20 and user terminal 30, which are connected to operation management center 10, are plural. Preferably, plural buses different in riding capacity are prepared as on-demand bus 20.

In bus operation system 1, a reference operation schedule of on-demand bus 20, specifically, the number of services per day, an operation section (departure place and final destination) for each of operation services, a departure place departing time, and a final destination arrival time are predetermined. A through place is a specific stop on an operating route, at which on-demand bus 20 stops without fail. Like fixed-route bus services, an operating schedule taken as a reference is predetermined as described above. Moreover, in bus operation system 1, the operating route is appropriately set in response to a use request of the user, and an operation plan that satisfies the use request is generated.

An area where bus operation system 1 is usable is set for each of the operation services. The area is set within a range where on-demand bus 20 can be operated without causing a large delay from the reference operation schedule even if on-demand bus 20 detours and goes via getting-on/off places requested by the user.

As a matter of principle, on-demand bus 20 operates according to the reference operation schedule. Upon receiving the use request from the user before the operation, on-demand bus 20 operates according to the operation plan generated in response to the received use request. Moreover, upon receiving a new use request from the user during the operation or receiving a change of the use request (that is, a change of the getting-off place), on-demand bus 20 operates according to an operation plan updated in response to the use request. The use request by the user includes a designation of an operation service which the user desires to get on the bus (or a time period when the user desires to get on the bus) and includes a boarding section (a getting-on place and a getting-off place). The getting-off place does not have to be designated. In this case, the use request is processed by determining the final destination as the getting-off place.

In the present exemplary embodiment, as an example, it is assumed that, on a web site provided by operation management center 10, the user confirms the reference operation schedule, the operation plan, and an operation status, and makes a use start request and a use request (including a change of the boarding section and a cancellation of the use request). Note that the use start request and the use request may be made using a dedicated application, electronic mail, telephone without using the web site.

In the present exemplary embodiment, as on-demand bus 20, there is applied an autonomous driving vehicle capable of autonomously travelling according to an autonomous driving program. The autonomous driving program is generated in operation management center 10 on the basis of the operation plan of the operation service, and is provided to on-demand bus 20. The autonomous driving program may be generated in on-demand bus 20 serving as the operation service on the basis of the operation plan provided from operation management center 10.

Figure 2:
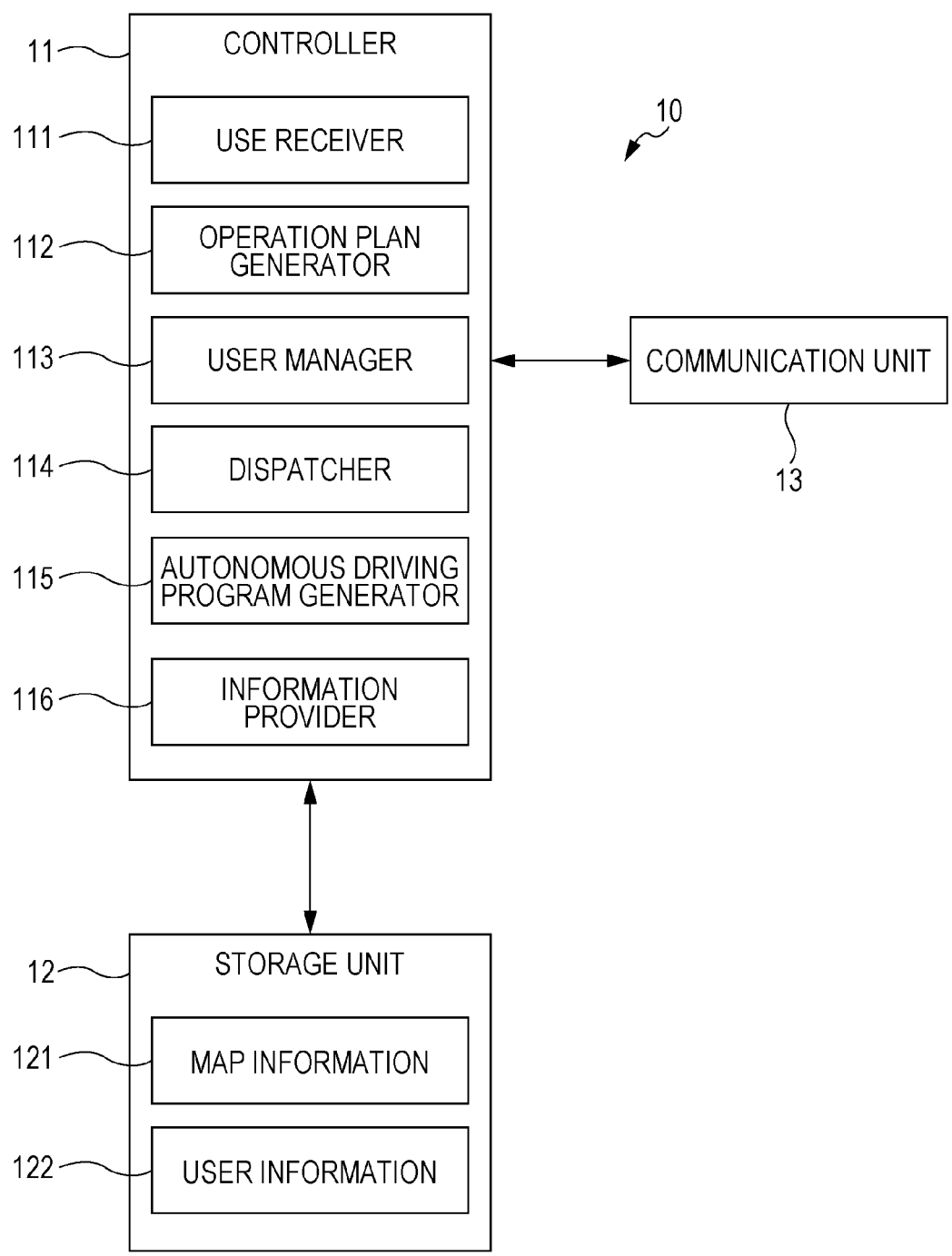
FIG. 2 is a diagram illustrating a configuration of an operation management center in the bus operation system.

FIG. 2 is a diagram illustrating a configuration of operation management center 10 in bus operation system 1. As illustrated in FIG. 2, operation management center 10 includes controller 11, storage unit 12, and communication unit 13.

Controller 11 includes a central processing unit (CPU) as a computing/control device, and a RAM and a ROM as a main storage device (neither is illustrated). The CPU reads from the ROM a program in accordance with a processing content, develops the read program in the RAM, and controls respective blocks in cooperation with the developed program. The ROM stores an operation management program for achieving operation management as well as a basic program called a basic input output system (BIOS). Controller 11 exchanges information with on-demand bus 20 and user terminal 30 via communication unit 13.

Controller 11 functions as use receiver 111, operation plan generator 112, user manager 113, dispatcher 114, autonomous driving program generator 115, and information provider 116. Functions of these will be detailed later with reference to a flowchart of FIG. 5.

Storage unit 12 is composed of, for example, a hard disk drive (HDD). Storage unit 12 stores map information 121, and user information 122. User information 122 includes a user identification (ID) issued to a user using bus operation system 1, and may include an actual operation result of the user (a date and time used, a boarding section, and others).

Figure 3:
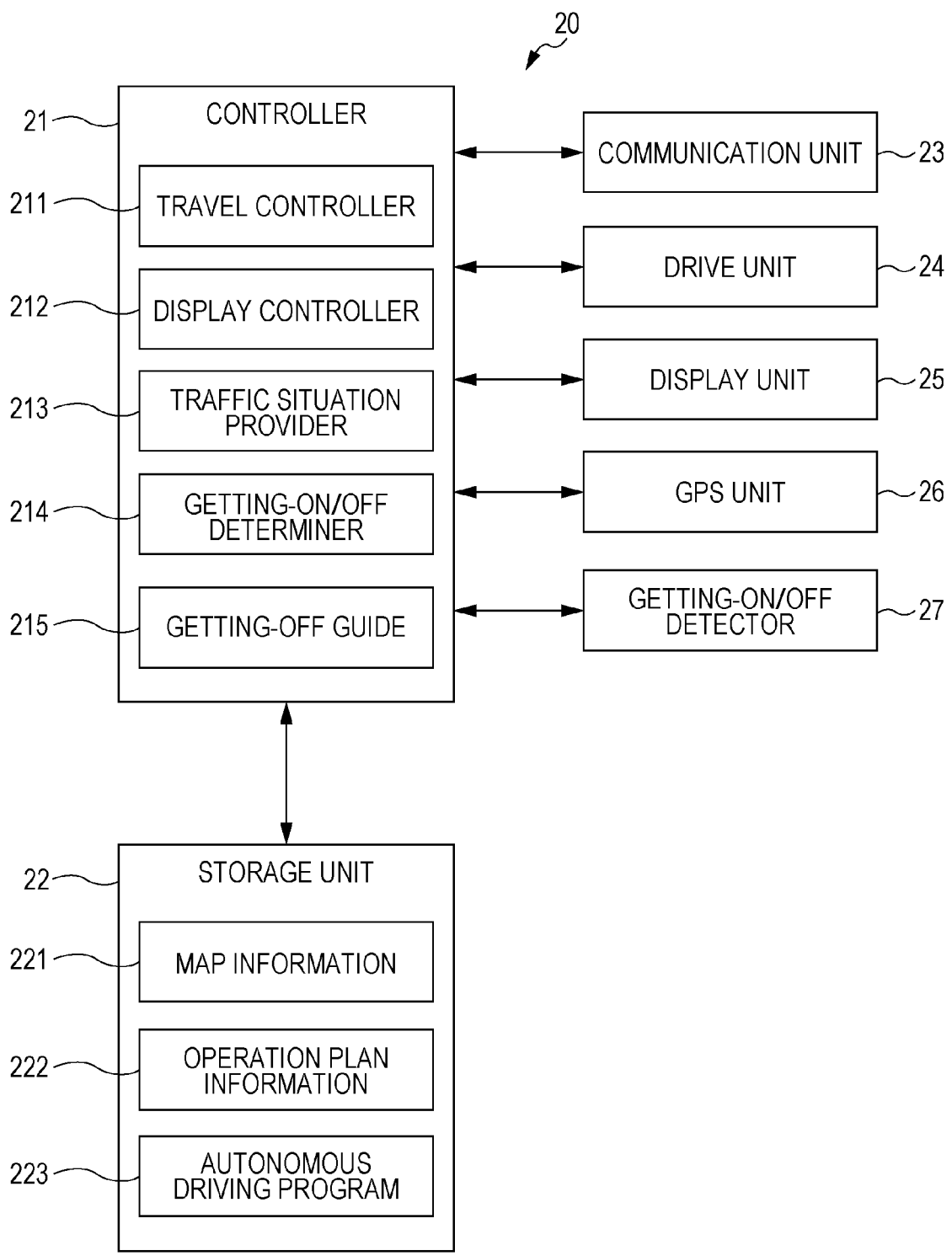
FIG. 3 is a diagram illustrating a configuration of an on-demand bus in the bus operation system.

FIG. 3 is a diagram illustrating a configuration of on-demand bus 20 in bus operation system 1. As illustrated in FIG. 3, on-demand bus 20 includes controller 21, storage unit 22, communication unit 23, drive unit 24, display unit 25, GPS unit 26, and getting-on/off detector 27.

Like controller 11 of operation management center 10, controller 21 includes a CPU, a RAM and a ROM (neither is illustrated). The ROM stores vehicle information (including a vehicle width, a vehicle height, a vehicle length, and a riding capacity) on on-demand bus 20 as well as a program executed when on-demand bus 20 is started. Controller 21 exchanges information with operation management center 10 and user terminal 30 via communication unit 23. Controller 21 functions as travel controller 211, display controller 212, traffic situation provider 213, getting-on/off determiner 214, and getting-off guide unit 215.

For example, storage unit 22 is an auxiliary storage device such as an HDD and a solid state drive (SSD). Storage unit 22 stores operation plan information 222 and autonomous driving program 223, which are provided from operation management center 10, as well as map information 221.

Drive unit 24 includes a drive system for causing on-demand bus 20 to travel, a brake system for decelerating on-demand bus 20, and an electronic control unit (ECU) for controlling the travel of on-demand bus 20. The ECU controls an output of an engine, engagement/disengagement of a clutch, and a gear shift of a transmission according to a driving instruction from travel controller 211, and controls braking force of a brake according to a braking instruction from travel controller 211.

Display unit 25 is an in-vehicle monitor, and provides information to a passenger according to an instruction from display controller 212. For example, display unit 25 displays the operating route, the getting-on/off place at which on-demand bus 20 stops, and a scheduled arrival time at the getting-on/off place, and others as the operation plan of on-demand bus 20 (see FIG. 6A, FIG. 6B, and FIG. 7).

GPS unit 26 includes: a GPS receiver that detects (measures) a position of an own vehicle based on a radio wave transmitted from an artificial satellite; a gyroscope sensor that detects a rotational angular velocity of the own vehicle; an acceleration sensor, and the like. Traffic situation provider 213 provides position information of the own vehicle to operation management center 10. The position information is acquired in GPS unit 26. On the basis of the position information of on-demand bus 20, operation management center 10 can estimate a travel situation of on-demand bus 20, and eventually, a traffic situation of the operating route at a present time point (a time point in the operation).

Getting-on/off detector 27 is, for example, cross beam sensors provided on a front door and rear door of on-demand bus 20. On the basis of detection signals from getting-on/off detector 27, it can be determined whether a user scheduled to get on on-demand bus 20 has got on on-demand bus 20 and whether a user scheduled to get off on-demand bus 20 has got off on-demand bus 20. Note that short distance wireless communication with user terminal 30 owned by the user can also be used as getting-on/off detector 27.

Figure 4:
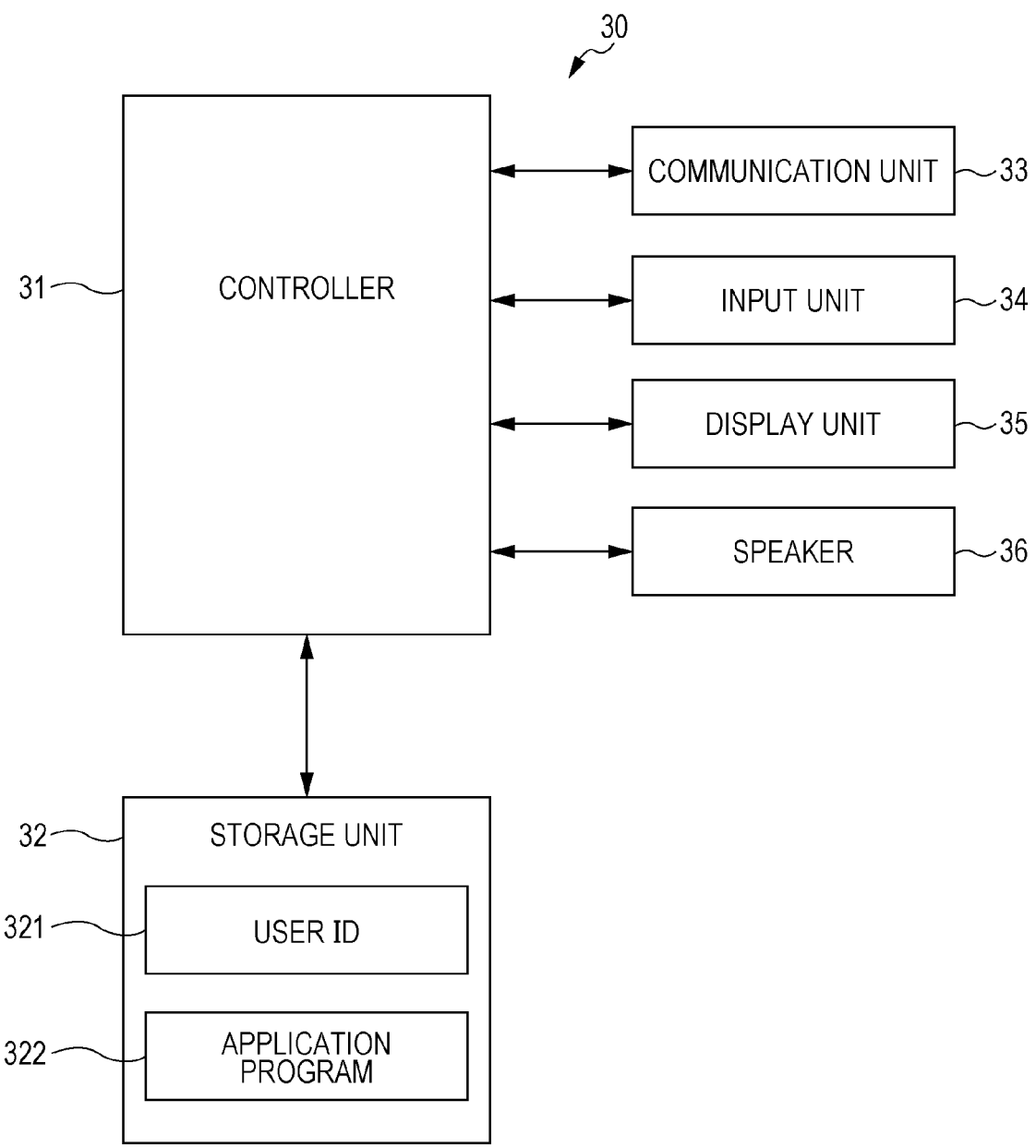
FIG. 4 is a diagram illustrating a configuration of a user terminal in the bus operation system.

FIG. 4 is a diagram illustrating a configuration of user terminal 30 in bus operation system 1. As illustrated in FIG. 4, user terminal 30 includes controller 31, storage unit 32, communication unit 33, input unit 34, display unit 35, and speaker 36. For example, user terminal 30 is a portable terminal such as a cellular phone, a smart phone, and a tablet terminal.

Like controller 11 of operation management center 10, controller 31 includes a CPU, a RAM and a ROM (neither is illustrated). Controller 31 exchanges information with operation management center 10 and on-demand bus 20 via communication unit 33.

For example, storage unit 32 is an auxiliary storage device such as an HDD, an SSD, and a secure digital (SD) card. For example, storage unit 32 stores user ID 321 issued by operation management center 10, and application program 322 of a browser for browsing the web site of bus operation system 1.

Input unit 34 and display unit 35 are composed of, for example, a flat panel display with a touch panel. As the flat panel display, a known display such as a liquid crystal display and an organic electroluminescence (EL) display can be used. The user can browse the web site of bus operation system 1 on display unit 35, and can make the use request on the web site by operating input unit 34.

Speaker 36 outputs a voice indicating that on-demand bus 20 is approaching the getting-off place, for example, on the basis of a getting-off guide provided from on-demand bus 20.

Figure 5:
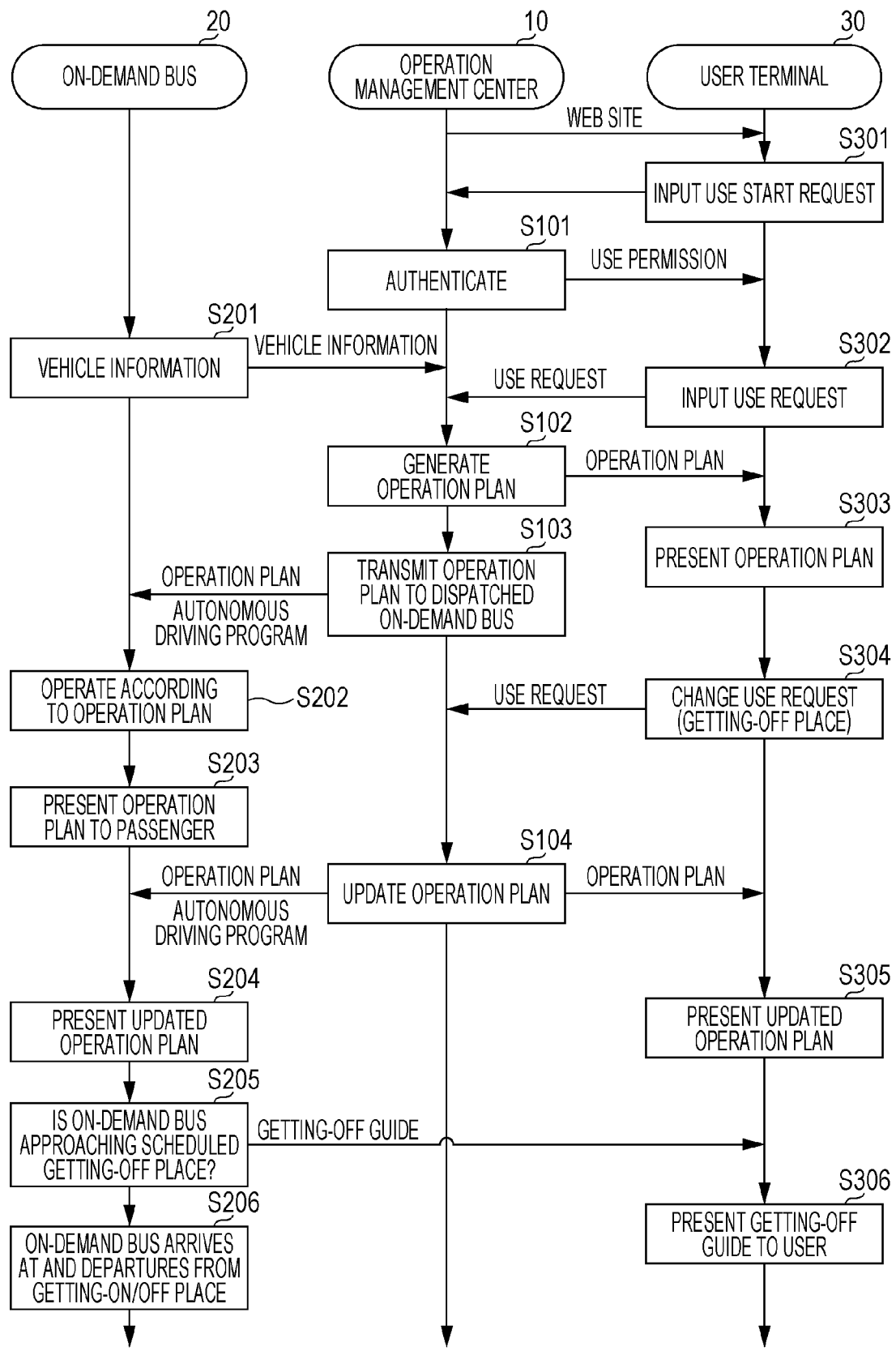
FIG. 5 is diagram illustrating an operation outline in the bus operation system.

FIG. 5 is diagram illustrating an operation outline of bus operation system 1. As illustrated in FIG. 5, bus operation system 1 is achieved in such a manner that operation management center 10, on-demand bus 20 and user terminal 30 associate with one another.

Here, as a precondition for using bus operation system 1, the user has acquired the user ID for using bus operation system 1. The user ID may be a one-time ID issued at the using time and invalidated at the getting-off time, or may be an ID provided with a valid date. Only such a use request made by the user who has acquired the user ID becomes receivable by operation management center 10. User manager 113 issues and manages the user ID.

In case of using bus operation system 1, when user terminal 30 connects to the web site of bus operation system 1, operation management center 10 provides a service on the web site (process of information provider 116). The user makes the use start request on the web site (Step S301). The use start request is, for example, a log-in operation by the input of the user ID.

On the basis of the user ID included in the use start request, operation management center 10 determines whether the user is an authorized user. Upon authenticating the authorized user, operation management center 10 permits the authorized user to use bus operation system 1 (Step S101, process of user manager 113). User terminal 30 is enabled to confirm the reference operation schedule, the operation status and others, and to input the use request.

Upon being started, on-demand bus 20 transmits the vehicle information to operation management center 10 (Step S201). The vehicle information includes the vehicle width, the vehicle height, the vehicle length, and the riding capacity. In case of dispatching such an operating bus, operation management center 10 uses the vehicle information acquired when the autonomous driving program is generated.

User terminal 30 issues the use request to operation management center 10 on the basis of the input operation of the use request by the user (Step S302). The use request from user terminal 30 is received by use receiver 111. While confirming the reference operation schedule, the user designates the operation service desired to get on, and inputs the getting-on/off places. For example, the user causes display unit 35 of user terminal 30 to display a map of an operation area, taps the desired getting-on/off places on this map, and can thereby input the getting-on/off places. When the user inputs a desired time period during which the user desires to get on on-demand bus 20, an operation service that meets the desired time period may be automatically designated by operation management center 10.

Upon receiving the use request from user terminal 30, operation management center 10 generates the operation plan on the basis of the reference operation schedule and the use request, and transmits the operation plan to user terminal 30 that has made the use request (Step S102, process of operation plan generator 112). The operation plan includes the operating route including the departure place, the final destination, the through place and the getting-on/off places based on the use request. The operation plan also includes the scheduled arrival time at each of the places. The generated operation plan is displayed on the web site of bus operation system 1, which is being browsed by the user (Step S303). In this way, the user can grasp the scheduled getting-on time at the desired getting-on place, and the scheduled getting-off time at the desired getting-off place.

When a plurality of user terminals 30 has issued the use requests, the operation plan is updated every time the use request is received, and the operation plan thus updated is transmitted to user terminal 30 of a user scheduled to get on on-demand bus 20 at that time point. The operation plan displayed on the web site of bus operation system 1 is also updated.

Specifically, operation plan generator 112 searches for an operating route going via the getting-on place and the getting-off place (only the getting-on place in some cases), which are included in the use request, within a permissible range of the reference operation schedule. The "permissible range of the reference operation schedule" means a range in which on-demand bus 20 can arrive at the final destination and the through point substantially on time (with a difference of a few minutes from each scheduled time). Here, the final destination and the through place are preset by the reference operation schedule. Even if the plurality of users has made the use requests, the operation plan is generated within the permissible range of the reference operation schedule, and accordingly, the operation plan is prevented from fluctuating greatly in terms of time.

At this time, preferably, operation plan generator 112 generates the operation plan in consideration of the current traffic situation. The current traffic situation is acquired, for example, using a traffic information providing service of a road traffic information center or the like. Moreover, during the operation of on-demand vehicle 20, the traffic situation in the operating route can also be estimated, for example, on the basis of vehicle position information provided from on-demand vehicle 20. In this way, on-demand vehicle 20 can be prevented from arriving late at the final destination, the through place, and the getting-on/off places based on the use request due to the congestion, traffic restrictions and the like though the operation plan is generated to remain within the permissible range of the reference operation schedule.

When no use request from user terminal 30 is received though the departure time of the operation service approaches, operation plan generator 112 generates the operation plan on the basis of the reference operation schedule. As a principle, the operation plan is generated to satisfy a use request made earlier, and accordingly, a part of a use request made later is not sometimes received (is not reflected on the operation plan). In such a case, for example, the user is given a suggestion to change the service for use, or is given a candidate place via which on-demand vehicle 20 can go.

Operation management center 10 also transmits the generated operation plan to dispatched on-demand bus 20 (Step S103, process of operation plan generator 112). On the basis of the number of persons scheduled to get on on-demand bus 20, the number being included in the operation plan immediately before the departure, operation plan generator 112 can dispatch on-demand bus 20 to be operated. In this way, user transport efficiency is improved, and accordingly, the bus enterprise can reduce cost of transportation.

At this time, operation management center 10 generates the autonomous driving program for controlling drive unit 24 of on-demand bus 20 so that on-demand bus 20 travels according to the operation plan, and transmits the generated autonomous driving program to on-demand bus 20 together with the operation plan (process of autonomous driving program generator 115).

On-demand bus 20 autonomously travels in such a manner that the provided autonomous driving program is executed, and operates through the operating route according to the operation plan (Step S202). During the operation, on-demand bus 20 displays information indicating the operation plan on in-vehicle display unit 25 (Step S203). In this way, the user boarding on-demand bus 20 can grasp the operation plan with ease.

Figure 6A:
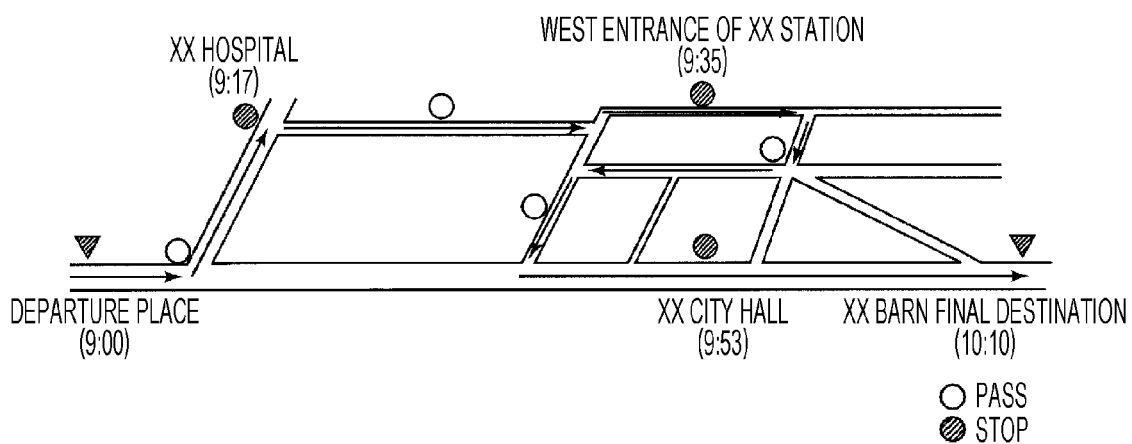
FIG. 6A is a diagram illustrating a display example of an operation plan in the on-demand bus and the user terminal.
Figure 6B:
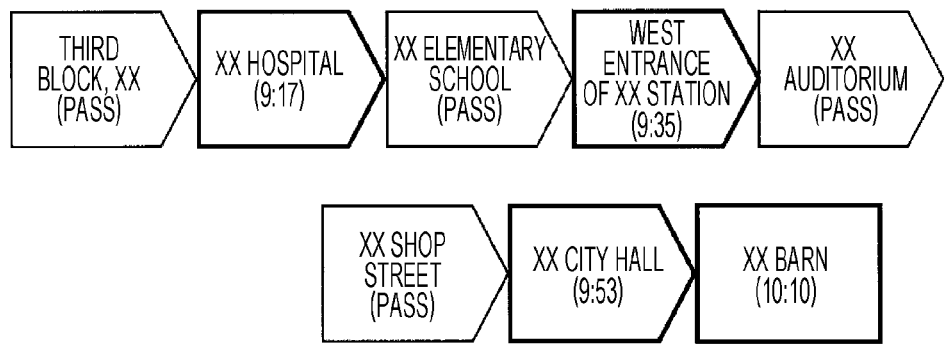
FIG. 6B is a diagram illustrating another display example of an operation plan in the on-demand bus and the user terminal.

FIG. 6A and FIG. 6B are diagrams illustrating an example of the operation plan displayed on display unit 25 of on-demand bus 20 and display unit 35 of user terminal 30. As illustrated in FIG. 6A, each of the getting-on/off places and the scheduled arrival time there may be displayed on a map together with the operating route. Alternatively, as illustrated in FIG. 6B, icons of the getting-on/off places (including candidates) may be arrayed to form the operating route, and each of the getting-on/off places and the scheduled arrival time there may be displayed. Note that, in FIG. 6A and FIG. 6B, the operation status may be displayed by displaying an icon of on-demand bus 20 on the present travelling place, and so on.

When a new use request is issued from user terminal 30 during the operation of on-demand bus 20 (Step S304) in FIG. 5, then as in Step S102, operation management center 10 updates the operation plan, and transmits the operation plan to user terminal 30 of the user who has made the use request, user terminal 30 of a user getting on on-demand bus 20, and user terminal 30 of a user who is scheduled to get on on-demand bus 20 (Step S104, process of operation plan generator 112). The updated operation plan is displayed on the web site of bus operation system 1 (Step S305). In this way, even if the operating route of the operation service, that is, each of the getting-on/off places and the scheduled arrival time there are changed, the user can grasp the change with ease. Even if the operation plan is updated on the basis of the new use request, the operation plan is updated within the permissible range of the reference operation schedule. Accordingly, the scheduled arrival time at each of the getting-on/off places of each user does not fluctuate largely.

Moreover, the updated operation plan is transmitted to on-demand bus 20 in operation together with an autonomous driving program newly generated based on the operation plan (Step S104). The same as above also applies to the cases where the user getting on on-demand bus 20 changes the getting-off place, the user scheduled to get on on-demand bus 20 changes the getting-on/off places and cancels the use request itself.

On-demand bus 20 displays information indicating the updated operation plan on display unit 25 (Step S204). In this way, the passenger of on-demand bus 20 can easily grasp the updated operation plan even if not using user terminal 30.

On-demand bus 20 compares the getting-off place of each user, which is included in the operation plan, and the present vehicle position with each other. When on-demand bus 20 approaches the getting-off place, on-demand bus 20 transmits the getting-off guide to user terminal 30 of the target user (S205). User terminal 30 presents the getting-off guide, which indicates that on-demand bus 20 is approaching the getting-off place, to the user by voice or image (Step S306). In this way, the user getting on on-demand bus 20 can prepare to get off on-demand bus 20 while leaving a time margin.

On-demand bus 20 stops at the getting-on/off place on time according to the operation plan, and departs after the user finishes getting on or off on-demand bus 20. Getting-on/off determiner 214 of on-demand bus 20 determines whether the user has got on on-demand bus 20 or determines whether the user has got off on-demand bus 20.

As described above, the user is transported from the requested getting-on place to the requested getting-off place. On-demand bus 20 is operated to the final destination while repeating the above processes.

Hereinafter, a description will be given of operation methods applicable to bus operation system 1 and specific services in the respective operation methods.

[First Operation Method]

Figure 7:
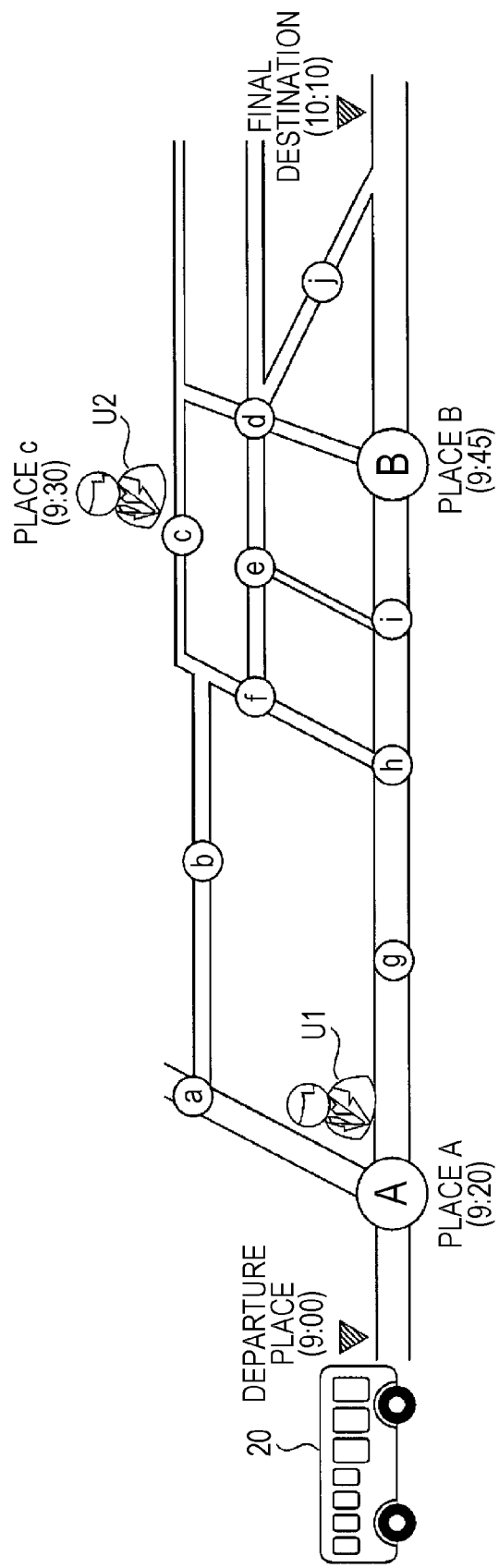
FIG. 7 is a diagram illustrating a first operation method.

FIG. 7 is a diagram illustrating a first operation method. In the first operation method, as the reference operation schedule of on-demand bus 20, there are predetermined a departure place, a final destination, through places, and a scheduled arrival time at each of the places. Moreover, candidate places where on-demand bus 20 are capable of stopping are predetermined. In FIG. 7, place A and place B are the through places, and place a to place j are the candidate places. The user can set the getting-on/off places from among place A and place B as the through places and place a to place j as the candidate places. When such a use request to set place A and place B as the getting-on places is not made, on-demand bus 20 may pass through these places.

For example, when user U1 issues a use request including place A that is a through place as a getting-on place before on-demand bus 20 departs from the departure place, operation management center 10 sets an operating route passing through place A, place g, place h, place i, and place B and going toward the final destination. The same as above also applies to the case where no use request is issued before on-demand bus 20 departs the departure place. User U1 is provided with an operation plan including the set operating route (departure place→A→g→h→i→B→final destination). Along this operating route, on-demand bus 20 performs autonomous travel to arrive at place A at 9:20, place B at 9:45, and the final destination at 10:10. At place A, user U1 can get on on-demand bus 20 at the predetermined scheduled arrival time (9:20).

Moreover, when a use request including place c as a getting-on place is issued from user U2 during the operation of on-demand bus 20 (for example, before on-demand bus 20 arrives at place A), then from among operating routes going via point c, operation management center 10 sets an operating route remaining within the permissible range of the reference operation schedule, for example, an operating route passing through place A, place a, place b, place c, place d, and place B and going toward the final destination. Users U1, U2 are provided with an operation plan including the updated operating route (departure place→A→a→b→c→d→B→final destination) and a scheduled arrival time at place c. Along this operating route, on-demand bus 20 performs autonomous travel to arrive at place c at 9:30, place B at 9:45, and the final destination at 10:10. At place c, user U2 can get on on-demand bus 20 at the scheduled getting-on time thus presented. Moreover, users U1, U2 are transported on time to the final destination.

When a getting-off place is included in the use request, the operating route is set to also go via the getting-off place. Also in this case, the user is transported to the getting-off place according to the scheduled getting-off time thus presented.

[Second Operation Method]

Figure 8:
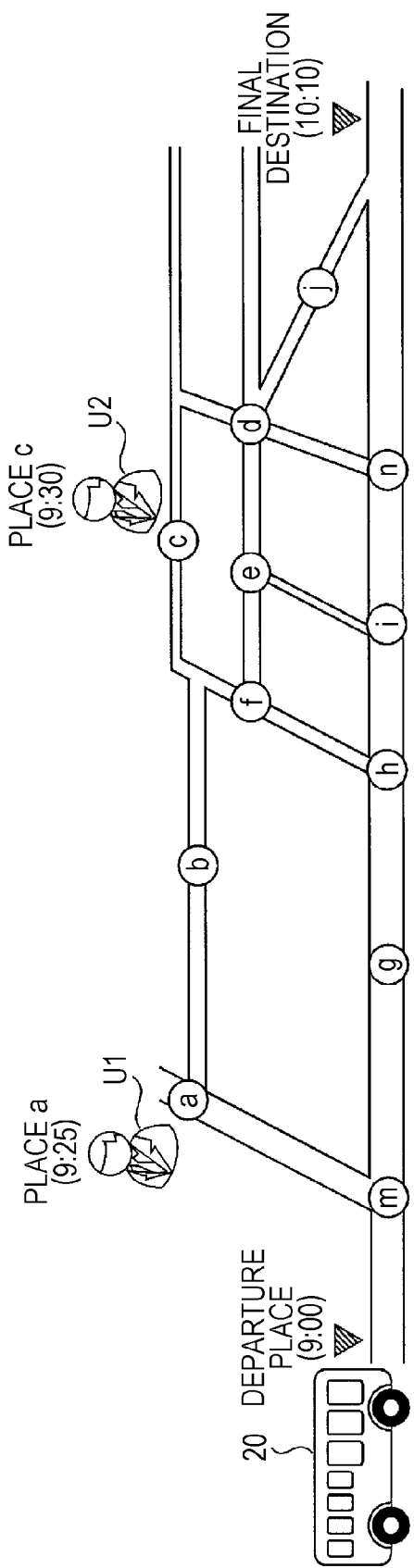
FIG. 8 is a diagram illustrating a second operation method.

FIG. 8 is a diagram illustrating a second operation method. In the second operation method, as the reference operation schedule of on-demand bus 20, there are predetermined a departure place, a final destination, and a scheduled arrival time at each of the places. Moreover, candidate places where on-demand bus 20 are capable of stopping are predetermined. The second operation method is different from the first operation method in that the through places via which on-demand bus 20 goes without fail are not determined. Since the through places are not determined, the second operation method has a higher degree of freedom in case of searching for the operating route than the first operation method. In FIG. 8, place a to place j, place m, and place n are the candidate places. The user can set the getting-on/off places from among place a to place j, place m, and place n as the candidate places.

For example, when no use request is issued from the user before on-demand bus 20 departs from the departure place, then in order that a distance between the departure place and the final destination becomes the shortest, operation management center 10 sets an operating route passing through place m, place g, place h, place i, and place n and going toward the final destination.

Moreover, when user U1 issues a use request including place a as a getting-on place and user U2 issues a use request including place c as a getting-on place during the operation of on-demand bus 20 (for example, before on-demand bus 20 arrives at place m), then from among operating routes going via point a and point c, operation management center 10 sets an operating route remaining within the permissible range of the reference operation schedule, for example, an operating route passing through place m, place a, place b, place c, place d, and place n and going toward the final destination. Users U1, U2 are provided with an operation plan including the updated operating route (departure place→m→a→b→c→d→n→final destination) and a scheduled arrival time at each of place a and place c. Along this operating route, on-demand bus 20 performs autonomous travel to arrive at place a at 9:25, place c at 9:30, and the final destination at 10:10. At place a, user U1 can get on on-demand bus 20 at the scheduled getting-on time (9:25) thus presented, and at place c, user U2 can get on on-demand bus 20 at the scheduled getting-on time (9:30) thus presented. Moreover, users U1, U2 are transported on time to the final destination.

[Third Operation Method]

Figure 9:
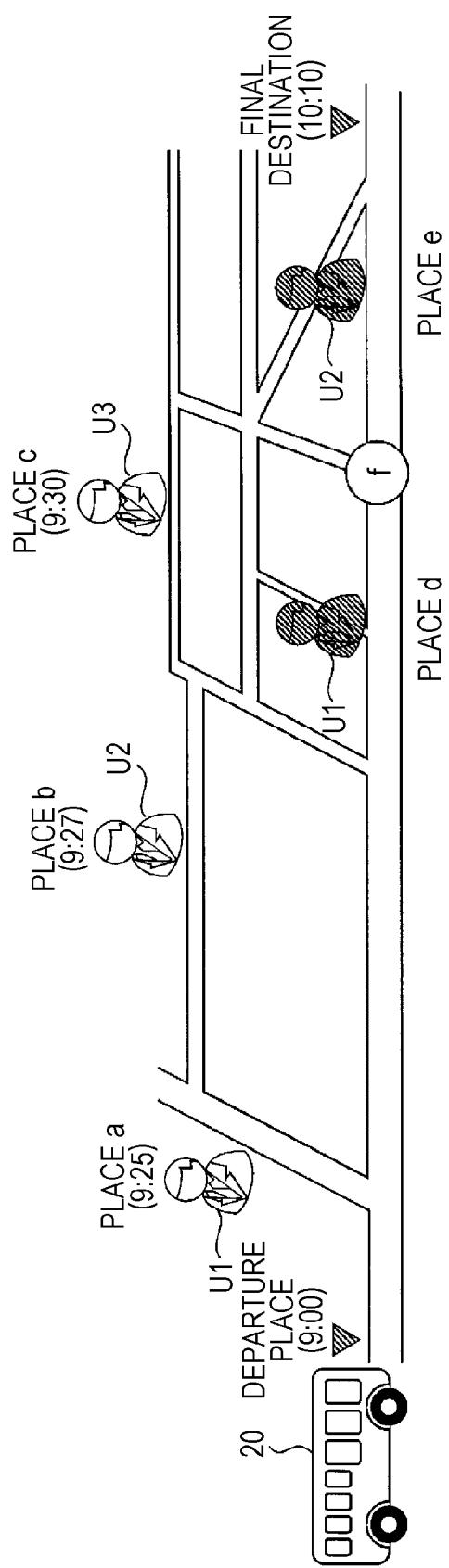
FIG. 9 is a diagram illustrating a third operation method.

FIG. 9 is a diagram illustrating a third operation method. In the third operation method, as the reference operation schedule of on-demand bus 20, there are only predetermined a departure place, a final destination, and a scheduled arrival time at each of the places, and candidate places at which on-demand bus 20 are capable of stopping are not determined. The user can freely set the getting-on/off places within a range of a usage area. Since the through places and the candidate places are not determined, the third operation method has a higher degree of freedom in case of searching for the operating route than the second operation method.

For example, when user U1 issues a use request including place a as a getting-on place, user U2 issues a use request including place b as a getting-on place, and user U3 issues a use request including place c as a getting-on place before on-demand bus 20 departs from the departure place, then from among operating routes going via place a, place b, and place c, operation management center 10 sets an operating route remaining within the permissible range of the reference operation schedule. At this time, from user terminals 30 operated by the users, latitude/longitude information of each of the places desired to get on/off and information on distances and directions of the place from main spots such as shops and facilities are transmitted as such use requests, whereby operation management center 10 specifies place a, place b, and place c, which are free getting-on/off places.

Users U1, U2 are provided with an operation plan including the updated operating route and a scheduled arrival time at each of place a, place b, and place c. Along this operating route, on-demand bus 20 performs autonomous travel to arrive at place a at 9:25, place b at 9:27, place c at 9:30, and the final destination at 10:10. At place a to place c, users U1 to U3 can respectively get on on-demand bus 20 at the scheduled getting-on time thus presented. Moreover, users U1 to U3 are transported on time to the final destination.

In case of the third operation method, the user can freely set the getting-on/off places within the range of the usage area. However, when the getting-on/off places requested by the plurality of users are close to one another within a fixed distance range (for example, 50 m or less), it is less efficient to stop at all the getting-on/off places. Hence, when the use requests from the plurality of user terminals 30 are received, preferably, an intermediate spot between the plurality of getting-on/off places is set as the getting-on/off place on the basis of the getting-on/off places included in the plurality of use requests. For example, as illustrated in FIG. 9, when the getting-off place desired by user U1 is place d, and the getting-off place desired by user U2 is place e, then place f as an intermediate position between these is set as the getting-off place of each of users U1, U2. Note that the stop position of on-demand bus 20 may be set in consideration of actual traffic/road conditions such that a place where a road width is wide is set as the getting-on/off place.

Figure 10:
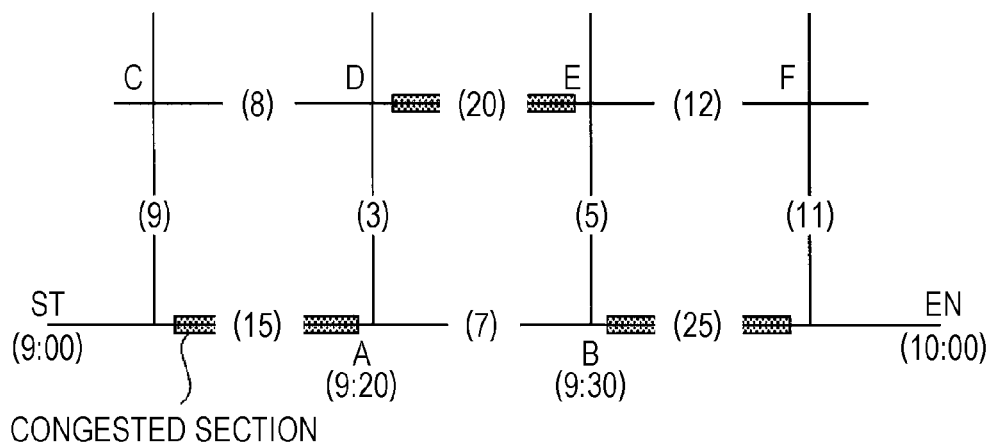
FIG. 10 is a diagram illustrating an example of a section duration to be referred to in case of searching for an operating route.

Hereinafter, a description will be given of a search algorithm in case of determining the operating route. FIG. 10 is a diagram illustrating an example of section duration map to be referred to in case of determining the operating route. FIG. 10 illustrates a case where there is set a reference operation schedule in which on-demand bus 20 departs from departure place ST at 9:00, passes through place A as the through place at 9:20 and place B as the through place at 9:30, and arrives at final destination EN at 10:00. Moreover, in FIG. 10, numerals between the respective places represent estimated durations. The estimated durations vary depending on not only distances but also congestion conditions of roads. Operation management center 10 collects the traffic information and the vehicle position information provided from on-demand bus 20, and calculates the estimated durations between the places.

When a use request including place D as a getting-on place before on-demand bus 20 departs from departure place ST, then based on the estimated duration between the respective places, an operating route is searched, in which the scheduled arrival time at each of place A and place B is maintained and a user who gets on on-demand bus 20 at place D is picked up.

For example, the case is estimated where traffic in a section from departure place ST to place A becomes heavy to deteriorate congestion in an operating route where on-demand bus 20 travels in order of departure place ST, place A, and place D. In this case, since the scheduled arrival time at place A is maintained though it takes some time, an operating route where on-demand bus 20 travels in order of departure place ST, place C, place D and place A is selected. This operating route is free from congestion, where an estimated duration from departure place ST to place A is 20 minutes.

Moreover, even if on-demand bus 20 travels in order of departure place ST and place A and can maintain an arrival time at place A, on-demand bus 20 cannot maintain an arrival time at place B in consideration of congestion in a section (place D→place E) of picking up the user at place D and going toward place B. In this case, an estimated duration from place A to place B is 28 minutes. Hence, an operating route where on-demand bus 20 travels in order of departure place ST, place C, place D, place A, and place B is selected. In this case, an estimated duration from place A to place B is 7 minutes.

As an operating route where on-demand bus 20 goes from section B toward final destination EN, two are conceivable, which are: an operating route where on-demand bus 20 travels in order of place B and final destination EN; and an operating route where on-demand bus 20 travels in order of place B, place E, place F, and final destination EN. In accordance with the present section duration map illustrated in FIG. 10, on-demand bus 20 can maintain the arrival time at final destination EN whichever operating route on-demand bus 20 may travel along. Accordingly, when traffic in the section from place B to final destination EN is estimated not to become heavy any more, the operating route (with an estimated duration of 25 minutes) is selected where on-demand bus 20 travels in order of place B and final destination EN. This operating route has a time margin until the scheduled arrival time at final destination EN. Meanwhile, when a cause of the congestion is a traffic accident and others, and it is easily estimated that the traffic in the section from place B to final destination EN becomes heavier, the operating route (with an estimated duration of 28 minutes) is selected where on-demand bus 20 travels in order of place B, place E, place F and final destination EN. This operating route does not have a time margin but is in time for the scheduled arrival time at final destination EN.

The above-mentioned search algorithm for the operating route is merely an example, and the operating route can be determined using known search algorithms.

As described above, bus operation system 1 according to the present exemplary embodiment includes: user terminal 30; on-demand bus 20 (on-demand vehicle) operating on the basis of the use request from user terminal 30; and operation management center 10 for managing the operation of on-demand bus 20, in which user terminal 30, on-demand bus 20 and operation management center 10 are connected to one another to communicate information. Operation management center 10 includes: use receiver 111 configured to receive the use request from user terminal 30; and operation plan generator 112 configured to generate the operation plan within the permissible range of the reference operation schedule on the basis of the reference operation schedule and the use request received by use receiver 111, the reference operation schedule having the operation section, the departure place departure time and the final destination arrival time preset, and configured to provide the generated operation plan to on-demand bus 20 and user terminal 30. User terminal 30 presents to the user the operation plan presented by operation plan generator 112. On-demand bus 20 operates according to the operation plan provided by operation plan generator 112.

That is, bus operation system 1 can be said to be a system that combines an advantage of the fixed-route bus operating according to the reference operation schedule and an advantage of the on-demand bus operating according to the use request. In accordance with the bus operation system 1, the user grasps the reference operation schedule, and then makes the use request to the operation service that matches the time period while the user desires to use on-demand bus 20. Accordingly, it becomes unnecessary for the bus enterprise to take such measures as increasing the number of operating buses in response to the use request. Moreover, operation management center 10 generates the reference operation schedule within the permissible range of the reference operation schedule, and accordingly, the user can enjoy the operation plan as expected. Hence, in accordance with the bus operation system 1, the burden on the bus enterprise does not increase, and the convenience for the user can be improved remarkably.

Although the present disclosure has been specifically described above on the basis of the exemplary embodiment, the present disclosure is not limited to the above exemplary embodiment, and can be modified without departing from the spirit of the present disclosure.

For example, user terminal 30 may include a position detector such as a GPS unit, and operation management center 10 may select the getting-on place from among the candidate places on the basis of a detection result of the position detector (the detection result is a present position of the user).

For example, in the exemplary embodiment, the autonomous driving vehicle is applied as on-demand bus 20, but on-demand vehicle 20 may be a manual driving vehicle.

Figure 11A:
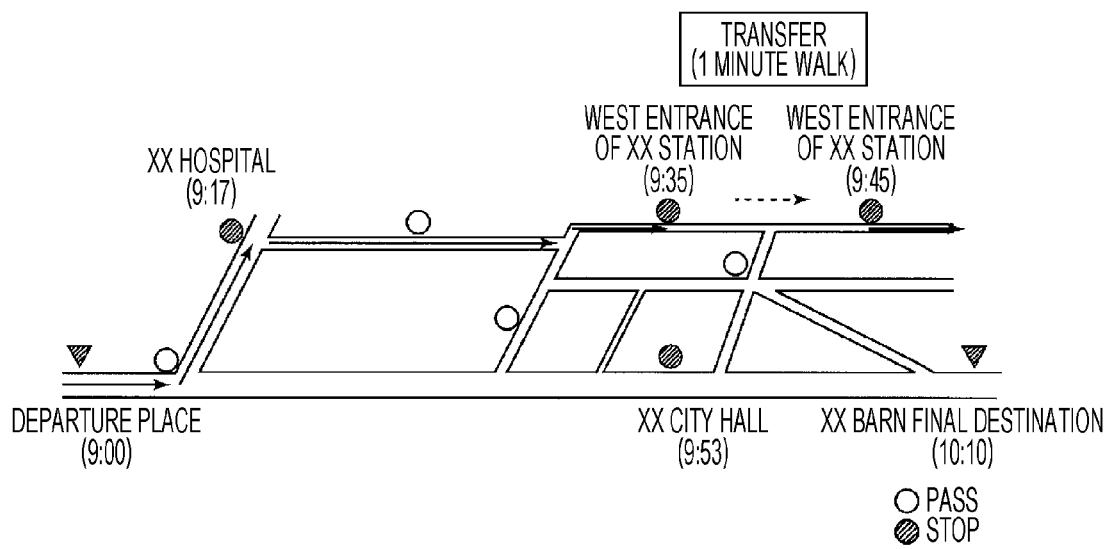
FIG. 11A is a diagram illustrating a display example of an operation plan in the user terminal (with transfer).
Figure 11B:
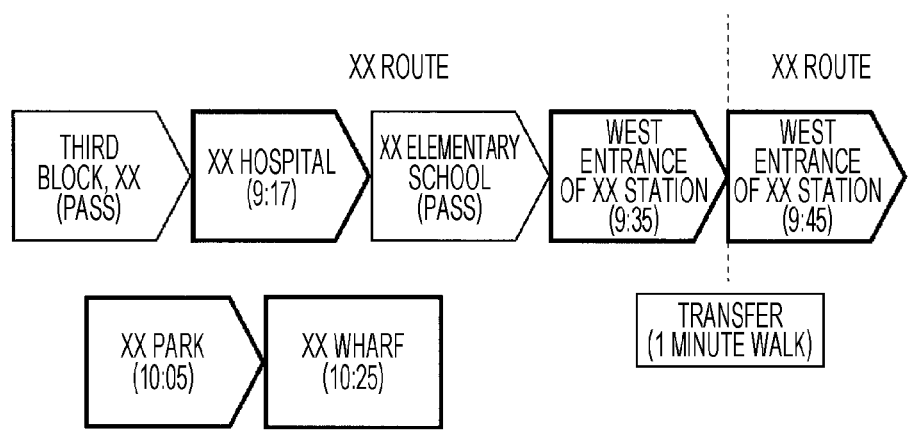
FIG. 11B is a diagram illustrating another display example of the operation plan in the user terminal (with transfer).

Moreover, in the use request, the operation sections (getting-on/off places) may be set across a plurality of the operation services such that a getting-on place is set in one of the operation services, and that a getting-off place is set in the other operation service. In this case, as illustrated in FIG. 11A, FIG. 11B, preferably, an operation plan including a transfer guide is displayed on display unit 35 of user terminal 30.

It should be construed that the exemplary embodiment disclosed herein is illustrative in all aspects, and is not restrictive. The scope of the present disclosure is represented by the scope of the claims and not by the above description, and it is intended that all modifications within the sense and scope equivalent to the claims are involved in the scope of the present disclosure.

INDUSTRIAL APPLICABILITY

The present disclosure is suitable for the demand responsive operation system applicable to the public transportation services such as the buses.

REFERENCE MARKS IN THE DRAWINGS

1: bus operation system (demand responsive operation system)
10: operation management center
11, 21, 31: controller
12, 22, 32: storage unit
13, 23, 33: communication unit
20: on-demand bus (on-demand vehicle)
24: drive unit
25, 35: display unit
26: GPS unit
27: getting-on/off detector
30: user terminal
34: input unit
36: speaker
111: use receiver
112: operation plan generator
113: user manager
114: dispatcher
115: autonomous driving program generator
116: information provider
121, 221: map information
122: user information
211: travel controller
212: display controller
213: traffic situation provider
214: getting-on/off determiner
215: getting-off guide unit
222: operation plan information
223: autonomous driving program
321: user ID
322: application program

The invention claimed is:

1. A method for controlling a demand responsive operation management system including a vehicle operating according to an operation plan, a first user terminal, a second user terminal, and an operation management apparatus communicably connected to the vehicle, the first user terminal and the second user terminal, the method comprising
after the vehicle starts operating according to a first operation plan, when the operation management apparatus receives a first use request including a first getting-on and off place from the first user terminal, and the operation management apparatus receives a second use request including a second getting-on and off place from the second user terminal and a distance between the first getting-on and off place and the second getting-on and off place is shorter than a predetermined distance, notifying the vehicle of a second operation plan in which a stop position is set to a place between the first getting-on and off place and the second getting-on and off place, and causing the vehicle notified of the second operation plan to start operating according to the second operation plan.

2. The method for controlling a demand responsive operation management system according to claim 1, wherein, when the operation management apparatus receives the first use request, and the operation management apparatus receives the second use request, the operation management apparatus notifies the vehicle and a display device mounted on the vehicle of the second operation plan.

3. The method for controlling a demand responsive operation management system according to claim 1, wherein
the first user terminal includes a display unit,
after the vehicle starts operating according to the first operation plan, the operation management apparatus further notifies the first user terminal of the second operation plan, and
the first user terminal notified of the second operation plan displays the second operation plan on the display unit.

4. The method for controlling a demand responsive operation management system according to claim 3, wherein the first user terminal notified of the second operation plan displays a getting-off guide on the display unit before a getting-off place based on the second operation plan, the getting-off guide telling a user to get off the vehicle.

5. The method for controlling a demand responsive operation management system according to claim 1, wherein, when, after the vehicle starts operating according to the first operation plan, the operation management apparatus receives the first use request, and the operation management apparatus receives the second use request, the vehicle is notified of the second operation plan in which the stop position is set to the place between the first getting-on and off place and the second getting-on and off place, the second operation plan corresponding to a traffic situation.

6. The method for controlling a demand responsive operation management system according to claim 5, wherein the operation management apparatus acquires the traffic situation from the vehicle.

7. The method for controlling a demand responsive operation management system according to claim 1, wherein
when the operation management apparatus receives the second use request from the second user terminal after the vehicle starts operating according to the second operation plan, the operation management apparatus notifies the vehicle of a third operation plan corresponding to the second use request, and
the vehicle notified of the third operation plan starts operating according to the third operation plan.

8. The method for controlling a demand responsive operation management system according to claim 1, wherein the operation management apparatus issues identification information to a user of the first user terminal, and makes a use request from the user receivable, the user having received the issued identification information.

9. The method for controlling a demand responsive operation management system according to claim 1, wherein the vehicle operating according to the operation plan is selectable from among a plurality of vehicles, and
the operation management apparatus selects the vehicle operating according to the operation plan from among the plurality of vehicles in response to a number of passengers scheduled to get on the vehicle, the number being included in the operation plan.

10. The method for controlling a demand responsive operation management system according to claim 1, wherein each of the first operation plan and the second operation plan includes a through place via which the vehicle goes without fail, and a scheduled arrival time at the through place.

11. The method for controlling a demand responsive operation management system according to claim 1, wherein a getting-on place and a getting-off place, the getting-on place and the getting-off place being included in each of the first use request and the second use request, are selectable from among a plurality of preset candidate places.

12. The method for controlling a demand responsive operation management system according to claim 1, wherein
the vehicle includes a getting-on and off detector configured to detect a fact that a user gets on and off the vehicle at getting-on and off places, and
the vehicle departs from the getting-on and off places based on the fact that the user gets on and off the vehicle, the fact being detected by the getting-on and off detector.

\* \* \* \* \*